US012739616B2

(12) United States Patent
Kanneath Abraham et al.

(10) Patent No.: US 12,739,616 B2
(45) Date of Patent: Sep. 15, 2026

(54) METHODS FOR SEMI-FLEXIBLE GAPS AND GAP SHARING

(71) Applicant: Nokia Technologies Oy, Espoo (FI)

(72) Inventors: Aby Kanneath Abraham, Bangalore (IN); Srinivasan Selvaganapathy, Bangalore (IN); Faranaz Sabouri-Sichani, Aalborg (DK); Laura Luque Sanchez, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 256 days.

(21) Appl. No.: 18/558,688

(22) PCT Filed: Apr. 28, 2022

(86) PCT No.: PCT/EP2022/061303
§ 371 (c)(1),
(2) Date: Nov. 2, 2023

(87) PCT Pub. No.: WO2022/233693
PCT Pub. Date: Nov. 10, 2022

(65) Prior Publication Data

US 2024/0236644 A1 Jul. 11, 2024

(30) Foreign Application Priority Data

May 7, 2021 (IN) ............................ 202141020853

(51) Int. Cl.
*H04W 8/20* (2009.01)
*H04W 8/18* (2009.01)
*H04W 56/00* (2009.01)

(52) U.S. Cl.
CPC ............. *H04W 8/20* (2013.01); *H04W 8/183* (2013.01); *H04W 56/0015* (2013.01)

(58) Field of Classification Search
CPC ... H04W 8/20; H04W 8/183; H04W 56/0015; H04W 76/16; H04W 76/28; H04W 76/27; H04W 76/10; H04W 88/06; H04W 24/10
See application file for complete search history.

(56) References Cited

U.S. PATENT DOCUMENTS

2018/0160422 A1 6/2018 Pathak et al.
2019/0342801 A1* 11/2019 Cui ...................... H04W 72/23
(Continued)

FOREIGN PATENT DOCUMENTS

WO 2020/247043 A1 12/2020
WO 2021/025491 A1 2/2021
WO 2021/060893 A1 4/2021

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

(Continued)

*Primary Examiner* — Jamal Javaid
(74) *Attorney, Agent, or Firm* — McCarter & English LLP

(57) ABSTRACT

Disclosed is a method comprising transmit, to a first base station associated with a first universal subscriber identity module, a first message indicating a request for a gap pattern for a second universal subscriber identity module, wherein the first message indicates at least a gap offset shift factor and/or a request for selecting a gap offset for the gap pattern from a plurality of gap offsets indicated in the first message, wherein the gap offset shift factor indicates an allowed shift to a start time of the gap pattern.

16 Claims, 10 Drawing Sheets

(56) References Cited

U.S. PATENT DOCUMENTS

| | | | | |
|---|---|---|---|---|
| 2020/0359196 | A1 | 11/2020 | Balasubramaniam et al. | |
| 2022/0109976 | A1 * | 4/2022 | Ozturk | H04W 8/24 |
| 2022/0361141 | A1 * | 11/2022 | Kumar | H04W 4/029 |

OTHER PUBLICATIONS

"Revised SID: Study on system enablers for multi-SIM devices", TSG SA Meeting #SP-83, SP-190248, Agenda Item: 17B.19, SA WG2, Mar. 20-22, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Study on system enablers for devices having multiple Universal Subscriber Identity Modules (USIM) (Release 17)", 3GPP TR 23.761, V1.3.0, Mar. 2021, pp. 1-109.

"New WID: Support for Multi-SIM devices in Rel-17", 3GPP TSG RAN Meeting #86, RP-193263, Agenda Item: 9.1.2, vivo, Dec. 9-12, 2019, 5 pages.

LG A290 Triple SIM, LG, Retrieved on Oct. 17, 2022, Webpage available at : https://www.lg.com/ae/mobile-phones/lg-A290.

"[post112-e][256][Multi-SIM] Network switching details (vivo)", 3GPP TSG-RAN WG2 Meeting #113-e, R2-2100474, Agenda item: 8.3.3, vivo, Jan. 25-Feb. 5, 2021, 47 pages.

"5G Cell Measurement—Serving and Neighbor Cell", Techplayon, Retrieved on Nov. 29, 2023, Webpage available at : https://www.techplayon.com/5g-nr-measurement-serving-cell-and-neighbor-cell/.

"3rd Generation Partnership Project; Technical Specification Group Radio Access Network; NR; Requirements for support of radio resource management (Release 17)", 3GPP TS 38.133, V17.1.0, Mar. 2021, 2172 pages.

Buthler et al., "Blind Detection and Prediction of Multi-SIM UE Subframe Loss", IEEE 83rd Vehicular Technology Conference (VTC Spring), May 15-18, 2016, 5 pages.

International Search Report and Written Opinion received for corresponding Patent Cooperation Treaty Application No. PCT/EP2022/061303, dated Aug. 31, 2022, 15 pages.

"Signalling design on short time switching procedure", 3GPP TSG-RAN WG2 #113bis-e, R2-2102940, Agenda Item: 8.3.3 UE notification on network switching for multi-SIM, DENSO Corporation, Apr. 12-20, 2021, pp. 1-4.

"Consideration on the Switching Notification Procedure", 3GPP TSG-RAN WG2 Meeting #113-e, R2-2100429, Agenda item: 8.3.3, ZTE Corporation, Jan. 25-Feb. 5, 2021, 13 pages.

"Summary of Al 8.3.3: UE notification on network switching for multi-SIM", 3GPP TSG-RAN WG2 Meeting #113bis-e, R2-2104319, Agenda item: 8.3.3, Samsung, Apr. 12-20, 2021, 14 pages.

"Switching notification for basic scenario for Multi-SIM", 3GPP TSG-RAN WG2 Meeting #113-bis Electronic, R2-2103184, Agenda item: 8.3.3, Nokia, Apr. 12-20, 2021, 4 pages.

"Further analysis on the signalling message contents for switching notification", 3GPP TSG-RAN WG2 Meeting #116 Electronic, R2-2110144, Agenda item: 8.3.3, Nokia, Nov. 1-12, 2021, 5 pages.

* cited by examiner

801 Indicate usage of gap sharing ratio

901 Transmit first message indicating at least a gap offset shift factor and/or a request for selecting a gap offset from a plurality of gap offsets 1001 Transmit indication for gap sharing capability between USIMs
FIG. 10
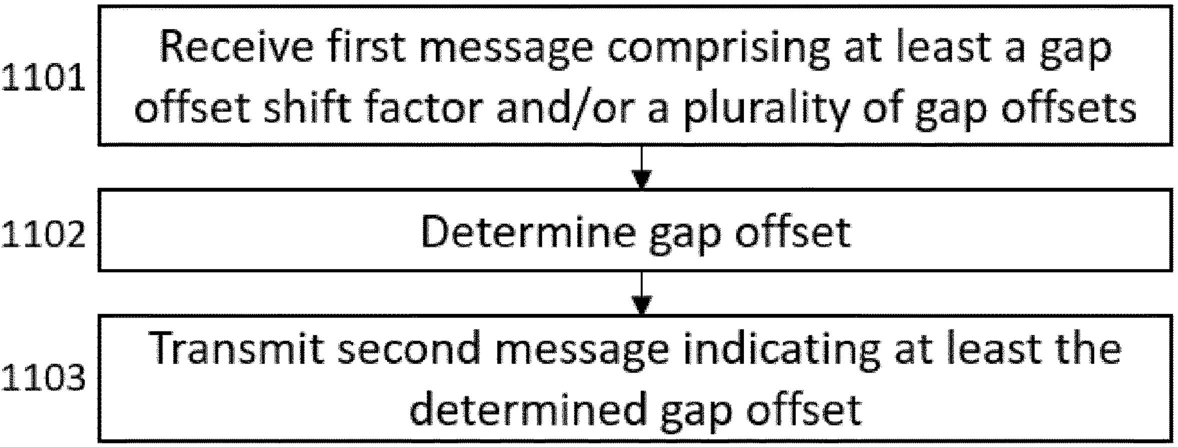
FIG. 11
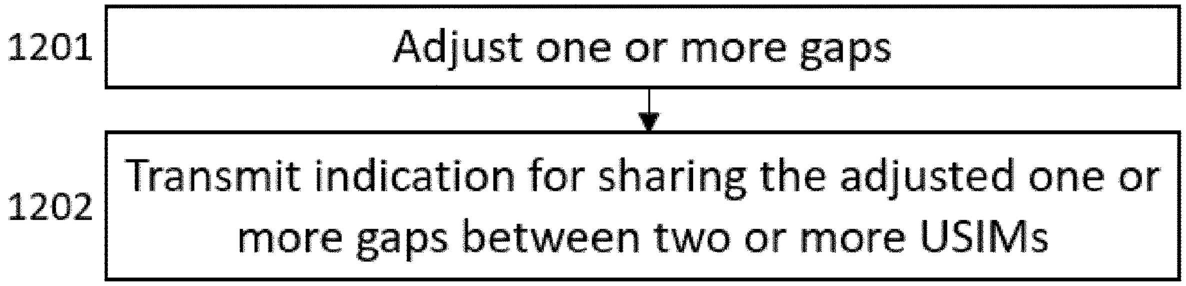
FIG. 12

METHODS FOR SEMI-FLEXIBLE GAPS AND GAP SHARING

RELATED APPLICATION

This application claims priority to IN Patent Application No. 202141020853, filed May 7, 2021, and entitled "METHODS FOR SEMI-FLEXIBLE GAPS AND GAP SHARING," and to PCT Patent Application No. PCT/EP2022/061303, filed Apr. 28, 2022, and entitled "METHODS FOR SEMI-FLEXIBLE GAPS AND GAP SHARING", which is incorporated herein by reference in its entirety.

FIELD

The following exemplary embodiments relate to wireless communication.

BACKGROUND

As resources are limited, it is desirable to optimize the usage of network resources. A terminal device and/or a base station may be utilized to enable better usage of resources and enhanced user experience to a user of the terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: transmit, to a first base station associated with a first universal subscriber identity module, a first message indicating a request for a gap pattern for a second universal subscriber identity module, wherein the first message indicates at least a gap offset shift factor and/or a request for selecting a gap offset for the gap pattern from a plurality of gap offsets indicated in the first message, wherein the gap offset shift factor indicates an allowed shift to a start time of the gap pattern.

According to another aspect, there is provided an apparatus comprising means for: transmitting, to a first base station associated with a first universal subscriber identity module, a first message indicating a request for a gap pattern for a second universal subscriber identity module, wherein the first message indicates at least a gap offset shift factor and/or a request for selecting a gap offset for the gap pattern from a plurality of gap offsets indicated in the first message, wherein the gap offset shift factor indicates an allowed shift to a start time of the gap pattern.

According to another aspect, there is provided a method comprising: transmitting, to a first base station associated with a first universal subscriber identity module, a first message indicating a request for a gap pattern for a second universal subscriber identity module, wherein the first message indicates at least a gap offset shift factor and/or a request for selecting a gap offset for the gap pattern from a plurality of gap offsets indicated in the first message, wherein the gap offset shift factor indicates an allowed shift to a start time of the gap pattern.

According to another aspect, there is provided a computer program comprising instructions for causing an apparatus to perform at least the following: transmit, to a first base station associated with a first universal subscriber identity module, a first message indicating a request for a gap pattern for a second universal subscriber identity module, wherein the first message indicates at least a gap offset shift factor and/or a request for selecting a gap offset for the gap pattern from a plurality of gap offsets indicated in the first message, wherein the gap offset shift factor indicates an allowed shift to a start time of the gap pattern.

According to another aspect, there is provided a computer readable medium comprising program instructions for causing an apparatus to perform at least the following: transmit, to a first base station associated with a first universal subscriber identity module, a first message indicating a request for a gap pattern for a second universal subscriber identity module, wherein the first message indicates at least a gap offset shift factor and/or a request for selecting a gap offset for the gap pattern from a plurality of gap offsets indicated in the first message, wherein the gap offset shift factor indicates an allowed shift to a start time of the gap pattern.

According to another aspect, there is provided a non-transitory computer readable medium comprising program instructions for causing an apparatus to perform at least the following: transmit, to a first base station associated with a first universal subscriber identity module, a first message indicating a request for a gap pattern for a second universal subscriber identity module, wherein the first message indicates at least a gap offset shift factor and/or a request for selecting a gap offset for the gap pattern from a plurality of gap offsets indicated in the first message, wherein the gap offset shift factor indicates an allowed shift to a start time of the gap pattern.

According to another aspect, there is provided an apparatus comprising at least one processor, and at least one memory including computer program code, wherein the at least one memory and the computer program code are configured, with the at least one processor, to cause the apparatus to: indicate, to a first base station associated with a first universal subscriber identity module, a capability for gap sharing between the first universal subscriber identity module and a second universal subscriber identity module.

According to another aspect, there is provided an apparatus comprising means for: indicating, to a first base station associated with a first universal subscriber identity module, a capability for gap sharing between the first universal subscriber identity module and a second universal subscriber identity module.

According to another aspect, there is provided a method comprising: indicating, to a first base station associated with a first universal subscriber identity module, a capability for gap sharing between the first universal subscriber identity module and a second universal subscriber identity module.

According to another aspect, there is provided a computer program comprising instructions for causing an apparatus to perform at least the following: indicate, to a first base station associated with a first universal subscriber identity module, a capability for gap sharing between the first universal subscriber identity module and a second universal subscriber identity module.

According to another aspect, there is provided a computer readable medium comprising program instructions for causing an apparatus to perform at least the following: indicate, to a first base station associated with a first universal subscriber identity module, a capability for gap sharing between the first universal subscriber identity module and a second universal subscriber identity module.

According to another aspect, there is provided a non-transitory computer readable medium comprising program instructions for causing an apparatus to perform at least the following: indicate, to a first base station associated with a first universal subscriber identity module, a capability for gap sharing between the first universal subscriber identity module and a second universal subscriber identity module.

According to another aspect, there is provided an apparatus comprising at least one processor, and at least one memory including computer program code, wherein the at least one memory and the computer program code are configured, with the at least one processor, to cause the apparatus to: receive, from a terminal device, a first message comprising at least a gap offset shift factor and/or a plurality of gap offsets, wherein the gap offset shift factor indicates an allowed shift to a start time of a gap pattern; determine a gap offset for the gap pattern, wherein the gap offset is determined based at least partly on the gap offset shift factor or by selecting the gap offset from the plurality of gap offsets; and transmit, to the terminal device, a second message indicating at least the determined gap offset.

According to another aspect, there is provided an apparatus comprising means for: receiving, from a terminal device, a first message comprising at least a gap offset shift factor and/or a plurality of gap offsets, wherein the gap offset shift factor indicates an allowed shift to a start time of a gap pattern; determining a gap offset for the gap pattern, wherein the gap offset is determined based at least partly on the gap offset shift factor or by selecting the gap offset from the plurality of gap offsets; and transmitting, to the terminal device, a second message indicating at least the determined gap offset.

According to another aspect, there is provided a method comprising: receiving, from a terminal device, a first message comprising at least a gap offset shift factor and/or a plurality of gap offsets, wherein the gap offset shift factor indicates an allowed shift to a start time of a gap pattern; determining a gap offset for the gap pattern, wherein the gap offset is determined based at least partly on the gap offset shift factor or by selecting the gap offset from the plurality of gap offsets; and transmitting, to the terminal device, a second message indicating at least the determined gap offset.

According to another aspect, there is provided a computer program comprising instructions for causing an apparatus to perform at least the following: receive, from a terminal device, a first message comprising at least a gap offset shift factor and/or a plurality of gap offsets, wherein the gap offset shift factor indicates an allowed shift to a start time of a gap pattern; determine a gap offset for the gap pattern, wherein the gap offset is determined based at least partly on the gap offset shift factor or by selecting the gap offset from the plurality of gap offsets; and transmit, to the terminal device, a second message indicating at least the determined gap offset.

According to another aspect, there is provided a computer readable medium comprising program instructions for causing an apparatus to perform at least the following: receive, from a terminal device, a first message comprising at least a gap offset shift factor and/or a plurality of gap offsets, wherein the gap offset shift factor indicates an allowed shift to a start time of a gap pattern; determine a gap offset for the gap pattern, wherein the gap offset is determined based at least partly on the gap offset shift factor or by selecting the gap offset from the plurality of gap offsets; and transmit, to the terminal device, a second message indicating at least the determined gap offset.

According to another aspect, there is provided a non-transitory computer readable medium comprising program instructions for causing an apparatus to perform at least the following: receive, from a terminal device, a first message comprising at least a gap offset shift factor and/or a plurality of gap offsets, wherein the gap offset shift factor indicates an allowed shift to a start time of a gap pattern; determine a gap offset for the gap pattern, wherein the gap offset is determined based at least partly on the gap offset shift factor or by selecting the gap offset from the plurality of gap offsets; and transmit, to the terminal device, a second message indicating at least the determined gap offset.

According to another aspect, there is provided an apparatus comprising at least one processor, and at least one memory including computer program code, wherein the at least one memory and the computer program code are configured, with the at least one processor, to cause the apparatus to: adjust one or more gaps associated with a terminal device; and transmit, to the terminal device, a first indication for sharing the adjusted one or more gaps between two or more universal subscriber identity modules of the terminal device.

According to another aspect, there is provided an apparatus comprising means for: adjusting one or more gaps associated with a terminal device; and transmitting, to the terminal device, a first indication for sharing the adjusted one or more gaps between two or more universal subscriber identity modules of the terminal device.

According to another aspect, there is provided a method comprising: adjusting one or more gaps associated with a terminal device; and transmitting, to the terminal device, a first indication for sharing the adjusted one or more gaps between two or more universal subscriber identity modules of the terminal device.

According to another aspect, there is provided a computer program comprising instructions for causing an apparatus to perform at least the following: adjust one or more gaps associated with a terminal device; and transmit, to the terminal device, a first indication for sharing the adjusted one or more gaps between two or more universal subscriber identity modules of the terminal device.

According to another aspect, there is provided a computer readable medium comprising program instructions for causing an apparatus to perform at least the following: adjust one or more gaps associated with a terminal device; and transmit, to the terminal device, a first indication for sharing the adjusted one or more gaps between two or more universal subscriber identity modules of the terminal device.

According to another aspect, there is provided a non-transitory computer readable medium comprising program instructions for causing an apparatus to perform at least the following: adjust one or more gaps associated with a terminal device; and transmit, to the terminal device, a first indication for sharing the adjusted one or more gaps between two or more universal subscriber identity modules of the terminal device.

According to another aspect, there is provided a system comprising at least a terminal device and a first base station. The terminal device is configured to: transmit, to the first base station, a first message indicating a request for a gap pattern for a second universal subscriber identity module of the terminal device, wherein the first base station is associated with a first universal subscriber identity module of the terminal device, wherein the first message indicates at least a gap offset shift factor and/or a request for selecting a gap offset for the gap pattern from a plurality of gap offsets indicated in the first message, and wherein the gap offset shift factor indicates an allowed shift to a start time of the gap pattern. The first base station is configured to: receive the first message from the terminal device; determine the gap offset for the gap pattern, wherein the gap offset is determined based at least partly on the gap offset shift factor or by selecting the gap offset from the plurality of gap offsets; and transmit, to the terminal device, a second message indicating at least the determined gap offset. The terminal device is further configured to: receive the second message from the first base station.

According to another aspect, there is provided a system comprising at least a terminal device and a first base station. The terminal device comprises means for: transmitting, to the first base station, a first message indicating a request for a gap pattern for a second universal subscriber identity module of the terminal device, wherein the first base station is associated with a first universal subscriber identity module of the terminal device, wherein the first message indicates at least a gap offset shift factor and/or a request for selecting a gap offset for the gap pattern from a plurality of gap offsets indicated in the first message, and wherein the gap offset shift factor indicates an allowed shift to a start time of the gap pattern. The first base station comprises means for: receiving the first message from the terminal device; determining the gap offset for the gap pattern, wherein the gap offset is determined based at least partly on the gap offset shift factor or by selecting the gap offset from the plurality of gap offsets; and transmitting, to the terminal device, a second message indicating at least the determined gap offset. The terminal device further comprises means for: receiving the second message from the first base station.

According to another aspect, there is provided a system comprising at least a terminal device and a first base station. The first base station is configured to: receive, from the terminal device, a first indication indicating a capability for gap sharing between a first universal subscriber identity module and a second universal subscriber identity module of the terminal device, wherein the first universal subscriber identity module of the terminal device is associated with the first base station; adjust one or more gaps associated with the terminal device; and transmit, to the terminal device, a second indication for sharing the adjusted one or more gaps between the first universal subscriber identity module and the second universal subscriber identity module. The terminal device is configured to: transmit the first indication to the first base station; and receive the second indication from the first base station.

According to another aspect, there is provided a system comprising at least a terminal device and a first base station. The first base station comprises means for: receiving, from the terminal device, a first indication indicating a capability for gap sharing between a first universal subscriber identity module and a second universal subscriber identity module of the terminal device, wherein the first universal subscriber identity module of the terminal device is associated with the first base station; adjusting one or more gaps associated with the terminal device; and transmitting, to the terminal device, a second indication for sharing the adjusted one or more gaps between the first universal subscriber identity module and the second universal subscriber identity module. The terminal device comprises means for: transmitting the first indication to the first base station; and receiving the second indication from the first base station.

BRIEF DESCRIPTION OF THE DRAWINGS

In the following, various exemplary embodiments will be described in greater detail with reference to the accompanying drawings, in which

FIGS. 7-12 illustrate flow charts according to some exemplary embodiments;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
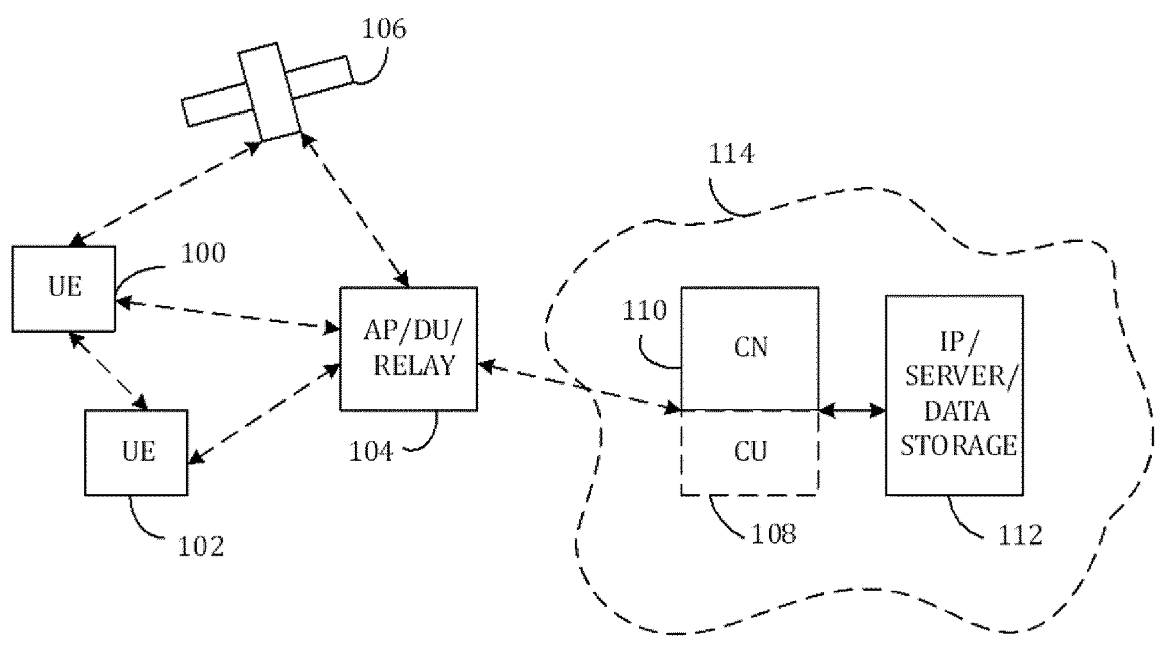
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identity module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloud-RAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

A subscriber identity module (SIM) card is an integrated circuit that may be used on a UE to store subscriber information for identifying and authenticating subscribers in a network. A universal integrated circuit card (UICC) is a physical card that may be used as a SIM card. An embedded subscriber identity module (eSIM) or an embedded universal integrated circuit card (eUICC) may also be used to provide an integrated SIM in a UE instead of or in addition to a removable card. The UICC or eUICC may comprise, for example, a SIM application and/or a universal subscriber identity module (USIM) application. The SIM application may be used for identifying and authenticating subscribers in GSM networks, while the USIM application may be used for identifying and authenticating subscribers in other network types as well.

USIM is a software application that may store subscriber-related information and implement the security functions related to authentication and ciphering on the user side. A multi-SIM UE, which may also be referred to as a multiple USIM (MUSIM) device, may support two or more USIMs at a time, wherein the multiple USIMs may be from a single mobile network operator or from different mobile network operators. A MUSIM device may use common radio and baseband components that are shared among the multiple USIMs. For example, while actively communicating with a first network associated with a first USIM, the UE may occasionally check a second network associated with a second USIM, for example to monitor the paging channel, perform signal measurements, or read the system information, and determine if it needs to respond to a paging request from the other network.

A MUSIM device may be used for different purposes. For example, separate USIMs may be used for home and roaming, or for office and personal purposes. They may also be used for having different subscription plans for data and voice. With slicing, one USIM may be used for certain slices, while another USIM may be used for other general services.

The behaviour of the MUSIM device with respect to the handling of multiple USIMs may depend on the capabilities of the device relating to concurrent independent RX and/or TX operations as described in the following. In a UE comprising a single receiver and a single transmitter (i.e. a single RX/single TX device), the UE is capable of receiving traffic from one network and transmitting traffic to one network at a time (type 1). In a UE comprising two receivers and a single transmitter (i.e. a dual RX/single TX device), the UE is capable of receiving traffic from two networks at a time, and transmitting to one network at a time (type 2). In a UE comprising two receivers and two transmitters (i.e. a dual RX/dual TX device), the UE is capable of receiving and transmitting to/from two networks at a time (type 3).

However, single RX/single TX MUSIM devices cannot receive paging messages or perform other RRC idle or inactive mode reception activities such as radio resource management (RRM) measurements in one USIM, while being in RRC connected mode in another USIM. If new data arrives for the idle mode USIM, then the network of the idle mode USIM probes the MUSIM device by sending a so-called paging message to the MUSIM device, and the MUSIM device then responds correspondingly. Idle mode paging monitoring refers to the MUSIM device periodically monitoring whether the network is sending any paging messages, while the MUSIM device is in RRC idle mode with the network. The idle mode monitoring may be performed periodically for example at fixed paging occasions (PO), which may have a high priority. Hence, the MUSIM device needs to interrupt its RRC connection with a first network during the time periods, when it has to monitor for paging messages from the second network periodically at the calculated POs. Thus, the MUSIM device may request gaps from its connected network corresponding to one USIM to perform activities such as idle mode monitoring in the idle or inactive network corresponding to its other USIM. The gaps refer to time periods, during which the RRC connection to a first network associated with a first USIM is interrupted, thereby not performing any operations such as scheduling of resources, uplink or downlink data transfer, radio link monitoring, radio resource management or other measurements at the first USIM, and the MUSIM device switches to a second network associated with a second USIM, which is in idle or inactive mode, in order to perform operations such as idle mode paging monitoring, reception of system information blocks (SIBs), and/or RRM measurements for cell selection or re-selection. The RRM measurements may comprise, for example, channel quality indicator (CQI), reference signal received power (RSRP), reference signal received quality (RSRQ), and/or received signal strength indicator (RSSI) associated with a neighbour cell.

In other words, when a MUSIM device such as a MUSIM-capable UE, which is registered at a first network (NWK-A) and a second network (NWK-B), is in RRC connected mode operation with NWK-A, the UE may need to periodically switch to NWK-B for RRC idle mode operations. The idle mode activities, which can be managed with periodic gaps, may comprise idle mode paging monitoring at the serving cell, SIB reception, and/or serving cell and neighbour cell RRM measurements of idle mode. In other words, the UE may need gaps for example for paging monitoring, SIB reception, and/or serving cell and neighbour cell measurements. Out of these activities, the gaps needed for paging monitoring may be determined and fixed by the paging occasion of NWK-B, but this information is not known to NWK-A, whereas the gaps needed for serving cell measurements can be configured by NWK-A depending on the traffic situation and distribution of scheduling gaps. As the time needed for the UE to listen to NWK-B may be limited for the above activities in the range of a few sub-frames for a set of radio frames, the UE may request a gap pattern statically at the time of RRC connection instead of notifying the switching for every occurrence. The gap pattern indicates one or more gaps that may be repeated on a periodical basis. The gap pattern may comprise, for example, a length, a periodicity, and/or an offset for the one or more gaps.

For the above scenarios, the UE may include the assistance information for the gap configuration in an existing uplink RRC message instead of a new RRC message for this purpose. The gap configuration may comprise, for example, a length of the gap in time, a periodicity at which the gap repeats, and/or an offset identifying the first subframe in a given gap. The network may include the gap configuration in an RRC reconfiguration message. The network may configure reduced gaps compared to those requested by the UE, if the internal constraints of the network do not allow to allocate the full gaps requested by the UE.

Figure 2:
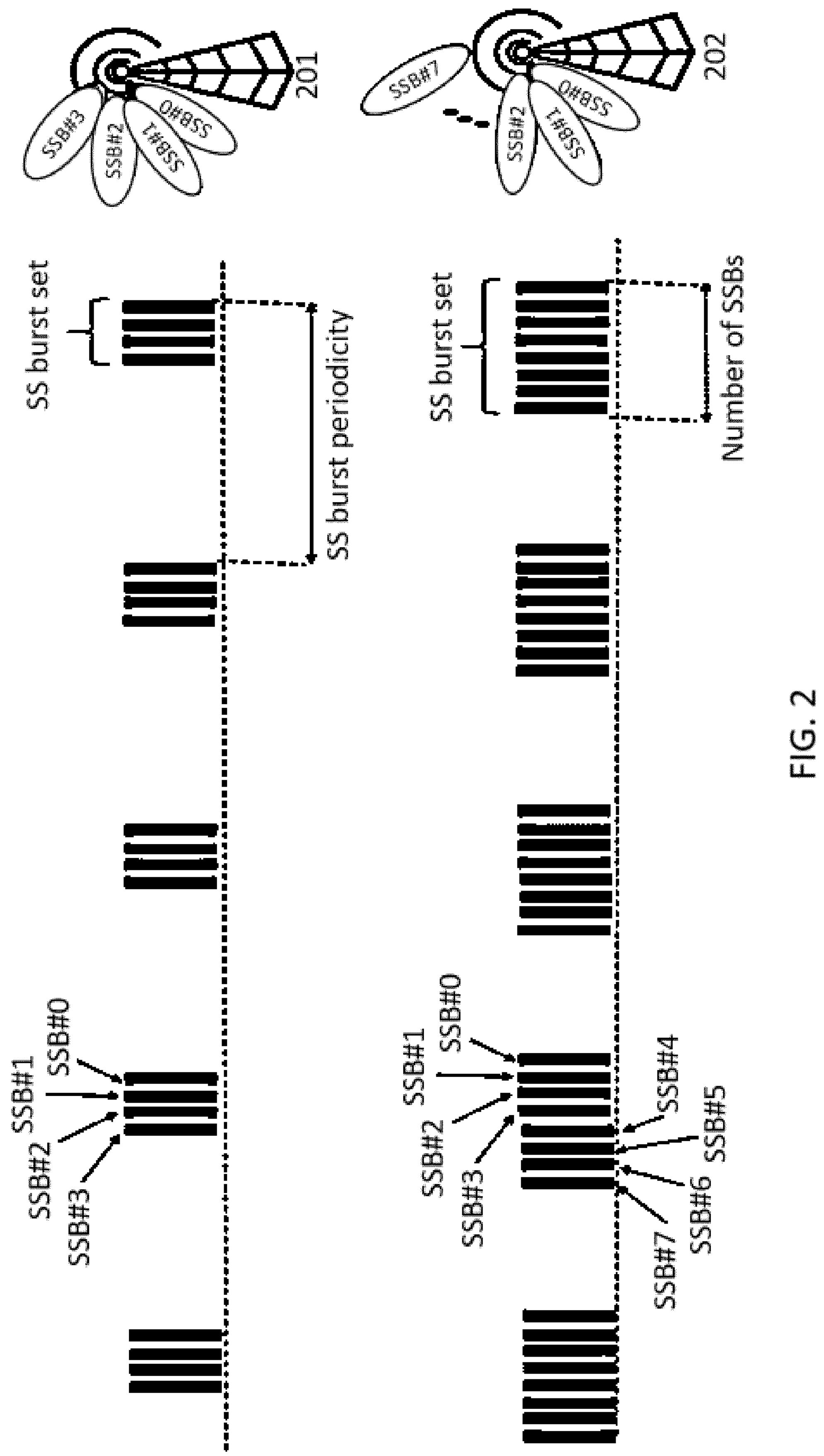
FIG. 2 illustrates synchronization signal blocks in two cells according to an exemplary scheme.

In 5G NR, UEs may measure neighbour cells by utilizing synchronization signal blocks (SSBs). FIG. 2 illustrates SSBs in two cells 201, 202 according to an exemplary scheme. In the first cell 201, there are four SSBs denoted as SSB #0, SSB #1, SSB #2 and SSB #3, which are transmitted in a single synchronization signal (SS) burst. In the second cell 202, there are eight SSBs denoted as SSB #0, SSB #1, SSB #2, SSB #3, SSB #4, SSB #5, SSB #6 and SSB #7, which are transmitted in a single SS burst. The SSB periodicity and the number of SSBs can be configured by the network. For example, the SSB periodicity can be 5, 10, 20, 40, 80 or 160 milliseconds (ms).

An SSB-based RRM measurement timing configuration (SMTC) window may be used for notifying the UEs about the measurement periodicity and the timings of SSBs that the UEs can utilize for the measurements. SMTC may be defined, for example, as follows:

```
SSB-MTC ::= SEQUENCE {
  periodicityAndOffset CHOICE {
    sf5 INTEGER (0..4),
    sf10 INTEGER (0..9),
    sf20 INTEGER (0..19),
    sf40 INTEGER (0..39),
    sf80 INTEGER (0..79),
    sf160 INTEGER (0..159)
  },
  duration ENUMERATED {sf1, sf2, sf3, sf4, sf5}
}
```

In NR, the first subframe of a given SMTC occasion occurs at a system frame number (SFN) and subframe as below:

```
SFN mod T = (FLOOR (Offset/10));
if the Periodicity is larger than sf5:
subframe = Offset mod 10;
else:
subframe = Offset or (Offset +5);
with T = CEIL(Periodicity/10)
```

The offset and periodicity may be given in units of subframes (so. The length of one subframe may be one millisecond, for example. For example, if NR SIB4 InterFreqCarrierFreqInfo broadcasts periodicityAndOffset sf20=5 and duration=sf2, an idle UE can measure SSB for this carrier at an offset of 5 ms every 20 subframes for a length of 2 subframes.

When an RRC connected UE is not able to measure inter-frequency or inter-RAT or intra-frequency neighbours, while performing data transfer with the serving cell substantially simultaneously, its network may configure measurement gaps. A measurement gap configuration may comprise a gap offset, gap length, gap repetition factor and/or gap timing advance. Some examples of gap configurations are provided below:

```
GapConfig ::= SEQUENCE {
  gapOffset INTEGER (0..159),
  mgl ENUMERATED { ms1dot5, ms3, ms3dot5, ms4, ms5dot5, ms6},
  mgrp ENUMERATED { ms20, ms40, ms80, ms160},
  mgta ENUMERATED { ms0, ms0dot25, ms0dot5},
  ...,
  [[
  refServCellIndicator ENUMERATED { pCell, pSCell, mcg-FR2}
OPTIONAL -- Cond NEDCorNRDC
  ]]
}
```

Measurement gap sharing applies when a UE needs measurement gaps to identify and measure intra-frequency cells, or when SMTC configured for intra-frequency measurement are fully overlapping with measurement gaps, and when the UE is configured to identify and measure cells on inter-frequency carriers and inter-RAT carriers. Table 1 below depicts examples of gap sharing schemes with network signals '00', '01', '10' or '11', where X is a signaled RRC parameter. If the gap sharing scheme is absent and there is no stored value in the field, it is up to the UE to determine which gap sharing scheme to apply.

TABLE 1

| Gap sharing scheme | Value of X [%] |
|---|---|
| '00' | Equal splitting |
| '01' | 25 |
| '10' | 50 |
| '11' | 75 |

Table 2 below depicts examples of requirements for inter-frequency measurements for idle mode according to current specifications. However, the current specifications do not consider a MUSIM scenario for an idle mode UE. In other words, in the current specifications, there is no consideration for gaps.

TABLE 2

| DRX cycle length [s] | Scaling Factor (N1) FR1 | FR2 | $T_{detect,NR\_Inter}$ [s] (number of DRX cycles) | $T_{measure,NR\_Inter}$ [s] (number of DRX cycles) | $T_{evaluate,NR\_Inter}$ [s] (number of DRX cycles) |
|---|---|---|---|---|---|
| 0.32 | 1 | 8 | 11.52 × N1 × 1.5 (36 × N1 × 1.5) | 1.28 × N1 × 1.5 (4 × N1 × 1.5) | 5.12 × N1 × 1.5 (16 × N1 × 1.5) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

An example of inter-frequency measurement requirement with gaps is presented in the following. Table 3 below depicts requirements for measurement period for inter-frequency measurements in frequency range 1 (FR1) with gaps. In this example, the periodicity requirement depends on the discontinuous reception (DRX) cycle, SMTC period, measurement gap configuration, and gap sharing configuration.

TABLE 3

| Condition | $T_{SSB\_measurement\_period\_inter}$ |
|---|---|
| No DRX | max[200 ms, [8] × max(MGRP, SMTC period)] × $CSSF_{inter}$ |
| DRX cycle ≤ 320 ms | max[200 ms, ceil(8 × 1.5) × max(MGRP, SMTC period, DRX cycle)] × $CSSF_{inter}$ |
| DRX cycle > 320 ms | [8] × DRX cycle × $CSSF_{inter}$ |

For example, two types of gaps may be used. The first gap type is a fixed gap for paging monitoring, wherein the network needs to provide the gap as requested by the UE. The second gap type is a flexible gap for RRM measurements, wherein the network is able to allocate the gaps at a different offset than requested by the UE. However, when the neighbour cell measurements are SSB measurements, the UE does not have complete flexibility for requesting the gaps for SSB-based measurements, since the requested gaps should overlap with the SMTC window of the neighbour cells. Therefore, there is a need to provide techniques to address this semi-flexible periodic gap.

Figure 3:
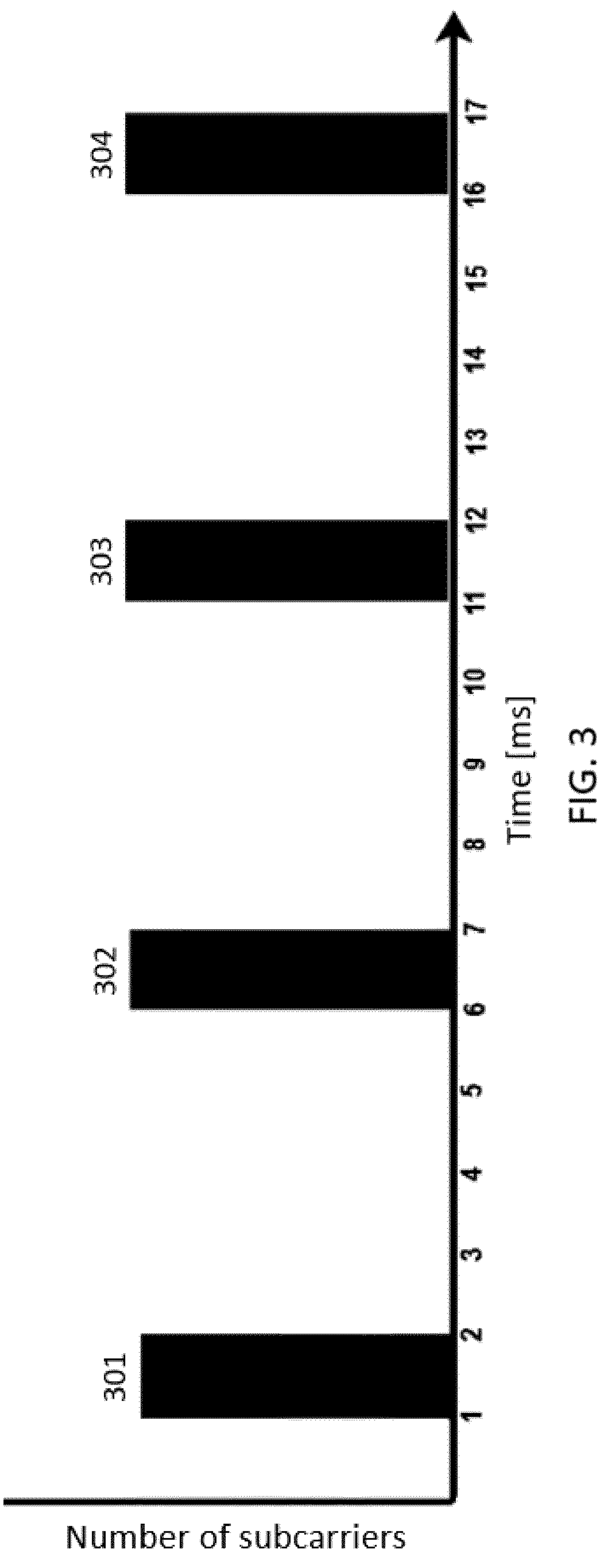
FIG. 3 illustrates an example of a semi-flexible gap.

FIG. 3 illustrates an example of a semi-flexible MUSIM gap for RRM and SMTC window of idle UE frequency. In FIG. 3, the horizontal axis indicates time in milliseconds, and the vertical axis represents the number of subcarriers. The blocks 301, 302, 303, 304 represent the SMTC window, i.e. the periods during which SSBs are transmitted. An idle or inactive UE protocol stack may perform SSB-based measurements during this period after receiving measurement gaps from a connected UE protocol stack. In this example, the SMTC periodicity is 5 subframes (sf), the SMTC offset is 1, and the SMTC duration is 1 sf. The idle cycle is 1280 sf. The measurement gap repetition period is 1280 sf.

Furthermore, if the measurement gaps configured for connected mode measurements overlap with the gaps needed for the idle or inactive UE protocol stack, either because SMTC windows of the connected UE protocol stack and the idle or inactive UE protocol stack overlap, or because the idle or inactive UE protocol stack has a cell-specific reference signal to be measured, the UE may decide not to request further gaps and to perform its idle or inactive mode measurements during at least a part of the measurement gap provided for connected mode measurements. However, this may affect the measurement performance of the connected mode UE protocol stack, since the actual gaps utilized by the UE may be reduced. Therefore, there is a need to provide techniques, wherein both the network and the UE are in sync for the gap sharing.

Figure 4:
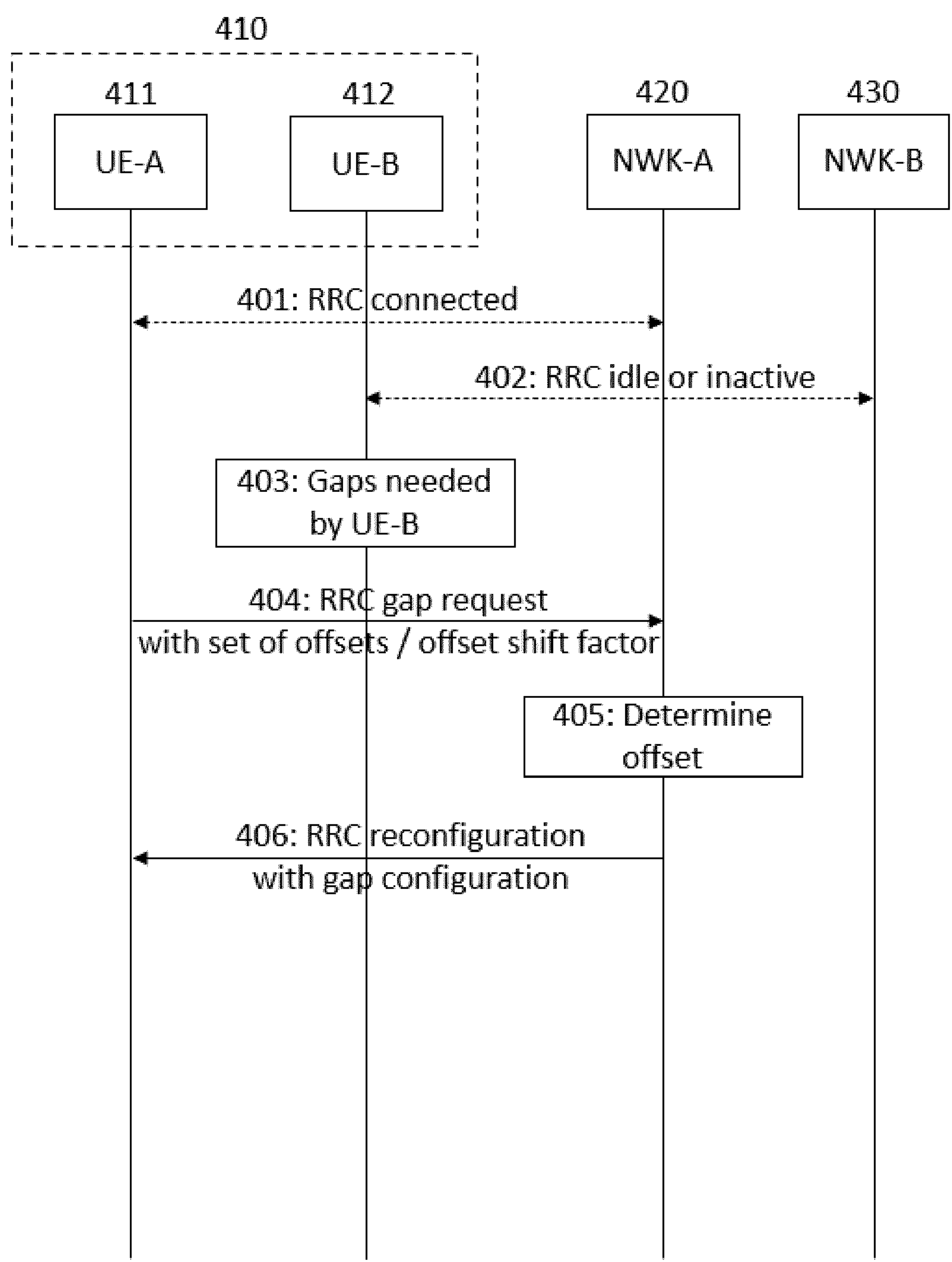
FIGS. 4-6 illustrate signaling diagrams according to some exemplary embodiments.

FIG. 4 illustrates a signaling diagram according to an exemplary embodiment, wherein a UE requests measurement gaps with semi-flexible offsets. The offset represents the start time of the gap.

Referring to FIG. 4, the UE 410 comprises at least a first USIM and a second USIM. In other words, the UE may be a MUSIM device comprising two or more USIMs. In FIG. 4, UE-A 411 and UE-B 412 denote the protocol stacks of the UE for the first USIM and the second USIM, respectively. UE-A is in RRC connected mode 401 with a first base station (for example a gNB) of a first network (NWK-A) 420. UE-B is in RRC idle mode 402 or RRC inactive mode with a second base station (for example a gNB) of a second network (NWK-B) 430.

UE-B determines 403 that periodic gaps are needed for example for paging monitoring or RRM measurements at UE-B.

UE-A transmits 404 a gap request message to the first base station to request a semi-flexible gap pattern for UE-B from NWK-A. The gap request message 404 may be, for example, an RRC assistance information message, a dedicated RRC message for requesting gaps, or any other RRC message. The gap request message may comprise a requested offset, length, periodicity, and/or offset shift factor for the gap pattern. Alternatively, the gap request message may comprise a set of offsets, a length, and/or a periodicity for the gap pattern. The set of offsets may comprise a plurality of possible starting offsets for the gaps within the periodicity. The offsets indicated by the set of offsets or by the offset shift factor may overlap with the starting offset of the SMTC window of the neighbour cells, on which UE-B intends to perform RRM measurements, for example. The periodicity, offset, offset shift factor, and/or the set of offsets may be provided as a number of subframes, for example. The length of one subframe may be 1 ms, for example.

The offset shift factor is a shift to the offset, i.e. start time, of the measurement gap. The offset shift factor may be determined based on the SMTC periodicity of UE-B's serving cell frequency or neighbour cell frequencies. If the SMTC periodicity is not available to UE-B, since it may be optional in the system information, then the SSB periodicity may be used for determining the offset shift factor. The UE may also adjust the offset shift factor based on some internal calculations, for example for performing the measurements of some neighbours with non-SSB measurements in the substantially same gap. However, the gaps may still overlap with the SMTC period.

Upon receiving the gap request, the first base station determines 405 an offset, i.e. a starting time for the gaps, based at least partly on the received gap request message. For example, the offset may be determined as the requested offset+offset shift factor*N, where N≥0 and the offset added by the gap length is within the requested measurement gap period. In other words, the offset may be determined as the requested offset added by the offset shift factor adjusted by N. Alternatively, the offset may be selected as one of the offsets from the set of offsets provided by the UE in the gap request message.

Thus, the first base station has some scheduling flexibility, since it is able to adjust the offset shift factor or select an offset from a set of multiple possible offsets according to its scheduling needs. Due to this flexibility in setting the offset, the gaps determined this way may be referred to as a semi-flexible gaps.

For example, the first base station may also be serving multiple other UEs, and some or all of them may request substantially the same offset and/or offset shift factor as requested by UE-A for UE-B. Due to the flexibility, the first base station may then distribute the gaps for the multiple UEs at different offsets, so that it is able to schedule some UEs at a particular time corresponding to an offset.

Alternatively, there may be some restrictions for providing gaps in some of the requested offsets. For example, in a time-division duplexing (TDD) case, for some configurations, there may be less uplink slots available, and some of the offsets requested may fall into these uplink slots. In such cases, due to the flexibility, the first base station may move the gaps to a different offset, which may fall into a downlink slot.

As a non-limiting example, the UE-A may request a gap with a length of 6 ms once in every 640 ms (i.e. with a 640 ms periodicity) with the offset for starting the gap as 40 ms, and an offset shift factor as 20. As an alternative example, UE-A may provide a set of offsets {40, 60, 80, 100, 120, 140, 160, 180, 200, 220, 240 . . . 500, 520, 540, 560, 580, 600, 620} to the first base station. The first base station may then allocate the 6 ms gap to start at any of the offsets {40, 60, 80, 100, 120, 140, 160, 180, 200, 220, 240 . . . 500, 520, 540, 560, 580, 600, or 620}. Without the offset shift factor or the set of offsets, the base station would need to allocate the gap at an offset of 40 ms, which would restrain the scheduling considerably.

The first base station transmits 406, to UE-A, an RRC reconfiguration message comprising the gap configuration indicating the gap pattern to be used by UE-B. The gap configuration comprises the gap offset determined (or selected) by the first base station, as well as the gap length and periodicity requested by UE-A. In other words, the gap offset of the gap configuration corresponds to the gap offset shift factor and to at least one gap offset indicated by UE-A in the gap request message 404. UE-B may then apply the received gap configuration. For example, UE-B may use the gaps for idle monitoring and/or RRM measurements associated with the second base station.

Figure 5:
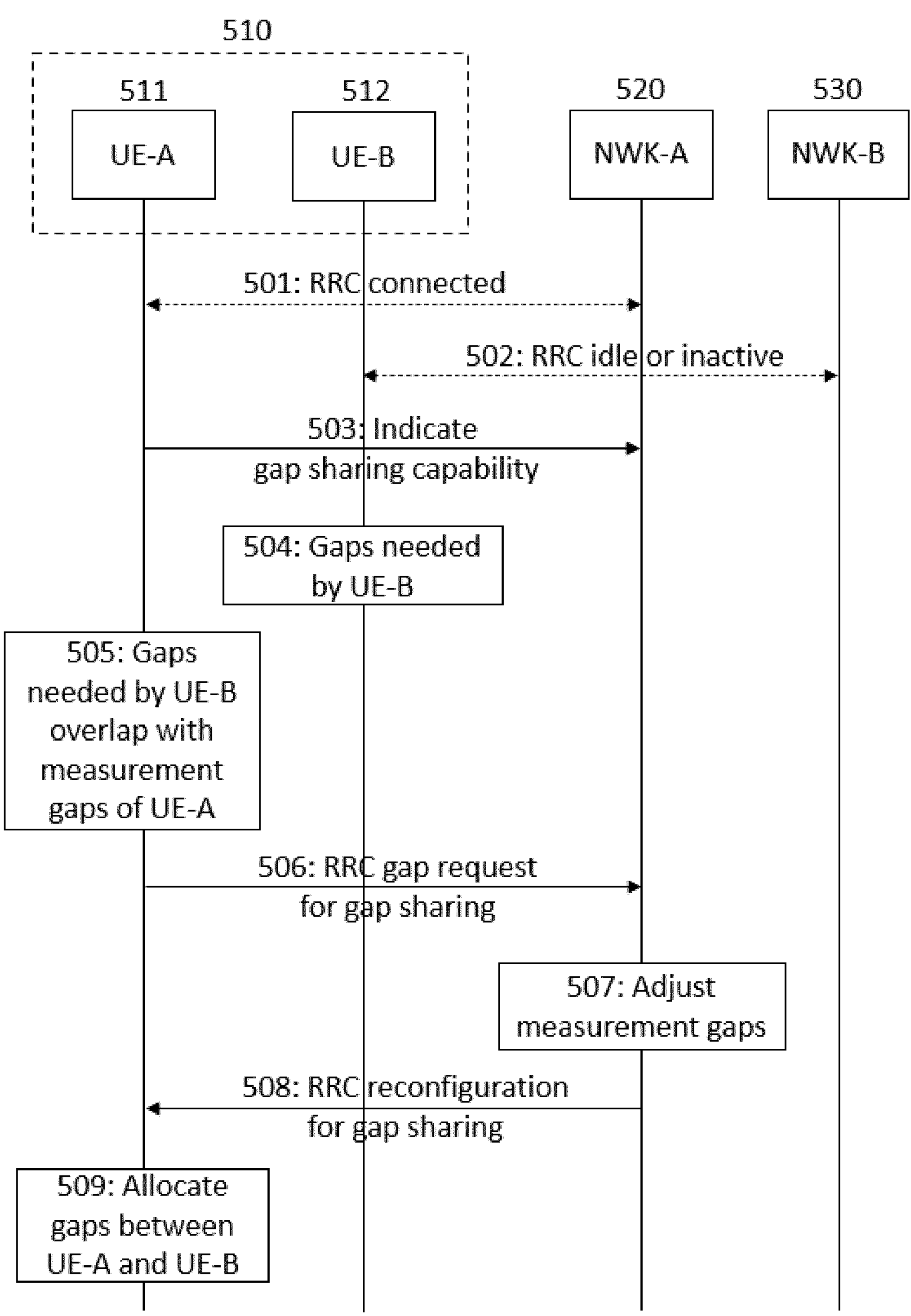

FIG. 5 illustrates a signaling diagram according to an exemplary embodiment, wherein UE-A may indicate a capability to NWK-A for sharing its measurement gaps with other USIMs. In this exemplary embodiment, NWK-A has already allocated measurement gaps for UE-A for its connected mode operations, such as handover measurements. The gaps needed by UE-B (for example for RRM measurements) are overlapping with the measurement gaps configured by UE-A for its own operations. UE-A then informs NWK-A that it needs to share its measurement gaps with UE-B. NWK-A may then confirm that UE-A is allowed to share the measurement gaps with UE-B. NWK-A may also reconfigure the measurement gap configuration for example by increasing the gap repetition factor, and/or by adjusting measurement criteria.

Referring to FIG. 5, the UE 510 comprises at least a first USIM and a second USIM. In other words, the UE may be a MUSIM device comprising two or more USIMs. UE-A 511 and UE-B 512 denote the protocol stacks of the UE for the first USIM and the second USIM, respectively. UE-A is in RRC connected mode 501 with a first base station (for example a gNB) of a first network (NWK-A) 520. UE-B is in RRC idle mode 502 or RRC inactive mode with a second base station (for example a gNB) of a second network (NWK-B) 530.

UE-A transmits 503 a capability report to the first base station to indicate a gap sharing capability of UE-A. Herein, the gap sharing capability means that UE-A is capable of sharing the allowed measurement gaps of UE-A with UE-B and/or with other USIM(s). The gap sharing capability may be indicated, for example, in an RRC UE capability information message, or a MUSIM assistance information message, or any other RRC message.

UE-B determines 504 that periodic gaps are needed for example for paging monitoring or RRM measurements at UE-B.

UE-A determines 505 that the gaps needed by UE-B overlap with the measurement gaps of UE-A, for example if the SMTC windows of both UE-A and UE-B overlap.

UE-A indicates 506, to the first base station, that it needs to share its measurement gaps with UE-B. Alternatively or additionally, the indication 506 may comprise a request for an increased gap length for the measurement gaps of UE-A, since the gap sharing with UE-B will reduce the gaps available for UE-A measurements. The indication 506 may be transmitted, for example, in an RRC assistance information message or any other RRC message.

Upon receiving the indication 506, the first base station may adjust 507, or reconfigure, the measurement gaps of UE-A for example by increasing the gap length, and/or by adjusting one or more measurement event thresholds.

The first base station transmits 508, to UE-A, an RRC message (for example an RRC reconfiguration message) to accept the gap sharing. Alternatively or additionally, the reconfiguration of the measurement gaps may be indicated in the message 508. UE-A then allocates 509, i.e. shares, the measurement gaps between UE-A and UE-B.

In another exemplary embodiment, the gap sharing request may be indicated 506 implicitly for example via a MUSIM gap request for UE-B instead of an explicit request for gap sharing. The MUSIM gap request may comprise, for example, a requested gap length, offset, periodicity, and/or a repetition factor. The first base station may then implicitly determine that the requested gaps overlap with the measurement gaps already allocated for UE-A, and that the measurement gaps therefore need to be shared between UE-A and UE-B. In order to compensate for the gap sharing, the first base station may adjust 507, or reconfigure, the measurement gaps of UE-A for example by increasing the gap length, and/or by adjusting one or more measurement event thresholds. The first base station transmits 508, to UE-A, an RRC message comprising the reconfiguration and/or an indication instructing UE-A to share the (reconfigured) measurement gaps of UE-A with UE-B. UE-A then allocates 509 the measurement gaps between UE-A and UE-B.

In another exemplary embodiment, the two exemplary embodiments described above with reference to FIGS. 4 and 5 may be used in combination. For example, a semi-flexible gap pattern may be obtained as described in FIG. 4, and the gaps of the semi-flexible gap pattern may then be shared between UE-A and UE-B as described in FIG. 5.

Figure 6:
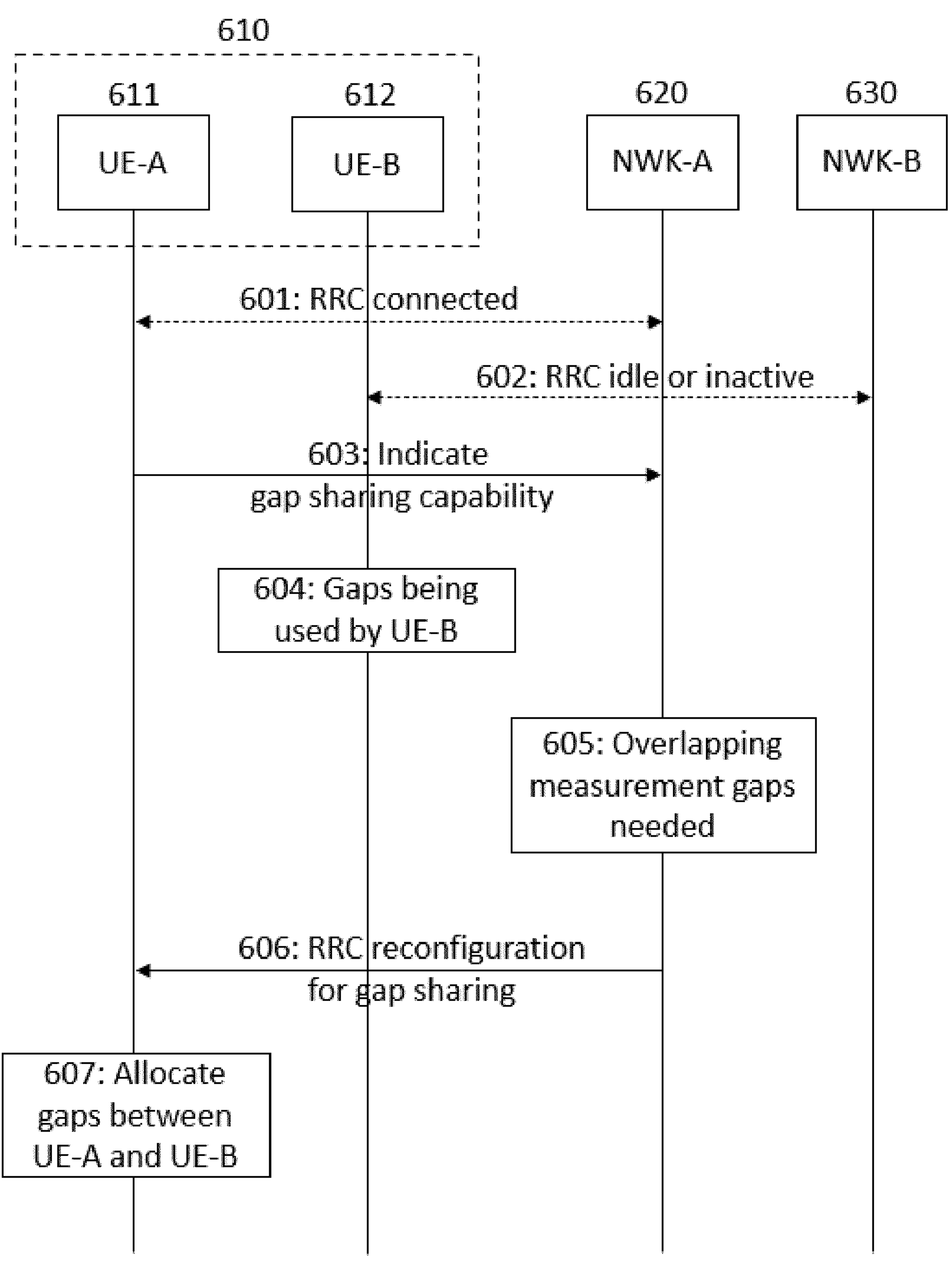

FIG. 6 illustrates a signaling diagram according to another exemplary embodiment, wherein the network configures a gap sharing ratio for the UE without receiving an explicit request from the UE for the gap sharing. When NWK-A needs to allocate measurement gaps for its connected mode operations with UE-A, and if they are overlapping with already allocated MUSIM measurement gaps in UE-B, and the MUSIM device is capable of gap sharing among its USIMs, NWK-A may request UE-A to share the gaps. NWK-A may also include a reconfiguration of the gaps together with the gap sharing request.

Referring to FIG. 6, the UE 610 comprises at least a first USIM and a second USIM. In other words, the UE may be a MUSIM device comprising two or more USIMs. UE-A 611 and UE-B 612 denote the protocol stacks of the UE for the first USIM and the second USIM, respectively. UE-A is in RRC connected mode 601 with a first base station (for example a gNB) of a first network (NWK-A) 620. UE-B is in RRC idle mode 602 or RRC inactive mode with a second base station (for example a gNB) of a second network (NWK-B) 630.

UE-A transmits 603 a capability report to the first base station to indicate a gap sharing capability of UE-A. The gap sharing capability means that UE-A is capable of sharing the allowed measurement gaps of UE-A with UE-B, and/or with other USIM(s). The gap sharing capability may be indicated, for example, in an RRC UE capability information message, or a MUSIM assistance information message, or any other RRC message.

UE-B is using 604 MUSIM measurement gaps for example for paging monitoring or RRM measurements at UE-B. For example, UE-B may be pre-configured with a semi-flexible gap pattern, as described above with reference to FIG. 4, or with any other type of gap pattern.

The first base station determines 605 that it needs to configure overlapping measurement gaps for UE-A, for example for a handover associated with the first base station, or for other connected mode operations. In other words, NWK-A needs to configure measurement gaps for UE-A that overlap with the gaps used by UE-B.

The first base station transmits 606, to UE-A, an RRC reconfiguration request message to instruct UE-A to share the measurement gaps between UE-A and UE-B, since UE-A has previously indicated that it is capable of gap sharing. For example, the instructions for sharing the measurement gaps may indicate a gap sharing ratio for allocating the measurement gaps between UE-A and UE-B. In order to compensate for the gap sharing, the RRC reconfiguration request message may also comprise a reconfiguration of the measurement gaps previously allocated to UE-B. For example, the gap length may be increased in order to compensate for the gap sharing. Upon receiving the gap sharing instructions 606, UE-A allocates 607, i.e. shares, the (reconfigured) measurement gaps between UE-A and UE-B.

In another exemplary embodiment, the gap sharing instructions 606 may be indicated implicitly instead of providing explicit instructions for sharing the gaps. The first base station has received 603 information from UE-A about its capability for gap sharing. The first base station determines 605 that it needs to allocate measurement gaps for UE-A that overlap with the gaps being used 604 by UE-B. The first base station transmits 606, to UE-A, an RRC message indicating a gap configuration that overlaps with the gaps being used by UE-B. Upon detecting that the received gap configuration overlaps with the gaps used by UE-B, UE-A determines that it needs to share the gaps between UE-A and UE-B, and thus UE-A allocates 607 the gaps indicated by the received gap configuration between UE-A and UE-B. In other words, the gap sharing is indicated to UE-A implicitly via the overlapping gap configuration.

Figures 7, 8, 9:
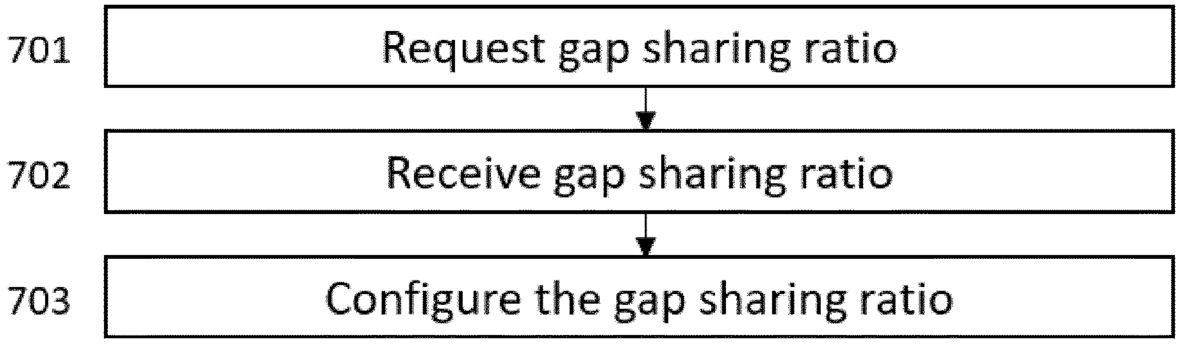

FIG. 7 illustrates a flow chart according to another exemplary embodiment, wherein UE-A requests 701 the first base station to provide the gap sharing ratio for allocating the measurement gaps between UE-A and UE-B. UE-A then receives 702 a message comprising the gap sharing ratio from the first base station. UE-A may then configure 703, or apply, the received gap sharing ratio.

FIG. 8 illustrates a flow chart according to another exemplary embodiment. In this exemplary embodiment, instead of requesting a gap sharing ratio, UE-A indicates 801 to the first base station that UE-A is using a specific gap sharing ratio. For example, UE-A may be using a pre-defined, or hard-coded, gap sharing ratio, or UE-A may be using a gap sharing ratio that has been previously configured by the first base station or some other base station.

FIG. 9 illustrates a flow chart according to another exemplary embodiment. The functions illustrated in FIG. 9 may be performed by an apparatus such as, or comprised in, a UE or a MUSIM device. Referring to FIG. 9, a first message is transmitted 901 to a first base station (for example a gNB) associated with a first USIM of the apparatus, wherein the first message indicates a request for a gap pattern for a second USIM of the apparatus. The first message indicates at least a gap offset shift factor and/or a request for selecting a gap offset for the gap pattern from a plurality of gap offsets indicated in the first message, wherein the gap offset shift factor indicates an allowed shift to a start time of the gap pattern. The second USIM may be associated with a second base station. The request for the gap pattern and the request for selecting a gap offset from the plurality of gap offsets may be implicit requests or explicit requests.

FIG. 10 illustrates a flow chart according to another exemplary embodiment. The functions illustrated in FIG. 10 may be performed by an apparatus such as, or comprised in, a UE or a MUSIM device. The apparatus indicates 1001, to a first base station (for example a gNB) associated with a first USIM of the apparatus, a capability for gap sharing between the first USIM and a second USIM of the apparatus.

FIG. 11 illustrates a flow chart according to another exemplary embodiment. The functions illustrated in FIG. 11 may be performed by an apparatus such as, or comprised in, a base station (for example a gNB). Referring to FIG. 11, a first message is received 1101 from a UE, wherein the first message comprises at least a gap offset shift factor and/or a plurality of gap offsets, wherein the gap offset shift factor indicates an allowed shift to a start time of a gap pattern. A gap offset for the gap pattern is determined 1102 based at least partly on the gap offset shift factor or by selecting the gap offset from the plurality of gap offsets. A second message indicating at least the determined gap offset is transmitted 1103 to the UE.

FIG. 12 illustrates a flow chart according to another exemplary embodiment. The functions illustrated in FIG. 12 may be performed by an apparatus such as, or comprised in, a base station (for example a gNB). Referring to FIG. 12, one or more gaps associated with a UE are adjusted 1201. A first indication for sharing the adjusted one or more gaps between two or more USIMs of the UE is transmitted 1202 to the UE.

The functions and/or blocks described above by means of FIGS. 4-12 are in no absolute chronological order, and some of them may be performed simultaneously or in an order differing from the described one. Other functions and/or blocks may also be executed between them or within them.

A technical advantage provided by some exemplary embodiments is that they may enable an efficient allocation of gaps in a MUSIM device for RRM measurements, when an idle or inactive UE needs to measure SSBs according to an SMTC window. Some exemplary embodiments may also enable gap sharing between an idle or inactive UE protocol stack and a connected UE protocol stack in a MUSIM device without impacting the performance of cell re-selection and handover.

Figure 13:
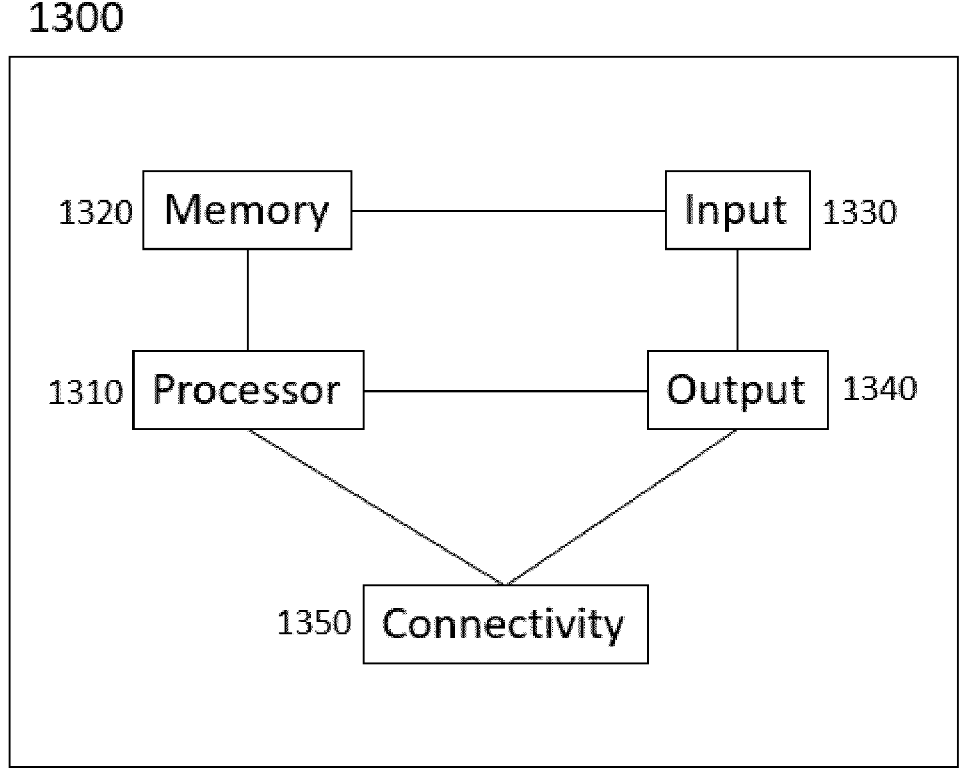
FIGS. 13-14 illustrate apparatuses according to some exemplary embodiments.

FIG. 13 illustrates an apparatus 1300, which may be an apparatus such as, or comprised in, a terminal device, according to an exemplary embodiment. A terminal device may also be referred to as a UE or user equipment herein. The apparatus 1300 comprises a processor 1310. The processor 1310 interprets computer program instructions and processes data. The processor 1310 may comprise one or more programmable processors. The processor 1310 may comprise programmable hardware with embedded firmware and may, alternatively or additionally, comprise one or more application-specific integrated circuits (ASICs).

The processor 1310 is coupled to a memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1320 stores computer readable instructions that are executed by the processor 1310. For example, non-volatile memory stores the computer readable instructions and the processor 1310 executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1300 may further comprise, or be connected to, an input unit 1330. The input unit 1330 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1330 may comprise an interface to which external devices may connect to.

The apparatus 1300 may also comprise an output unit 1340. The output unit may comprise or be connected to one or more displays capable of rendering visual content, such as a light emitting diode (LED) display, a liquid crystal display (LCD) and/or a liquid crystal on silicon (LCoS) display. The output unit 1340 may further comprise one or more audio outputs. The one or more audio outputs may be for example loudspeakers.

The apparatus 1300 further comprises a connectivity unit 1350. The connectivity unit 1350 enables wireless connectivity to one or more external devices. The connectivity unit 1350 comprises at least one transmitter and at least one receiver that may be integrated to the apparatus 1300 or that the apparatus 1300 may be connected to. The at least one transmitter comprises at least one transmission antenna, and the at least one receiver comprises at least one receiving antenna. The connectivity unit 1350 may comprise an integrated circuit or a set of integrated circuits that provide the wireless communication capability for the apparatus 1300. Alternatively, the wireless connectivity may be a hardwired application-specific integrated circuit (ASIC). The connectivity unit 1350 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1300 may further comprise various components not illustrated in FIG. 13. The various components may be hardware components and/or software components.

Figure 14:
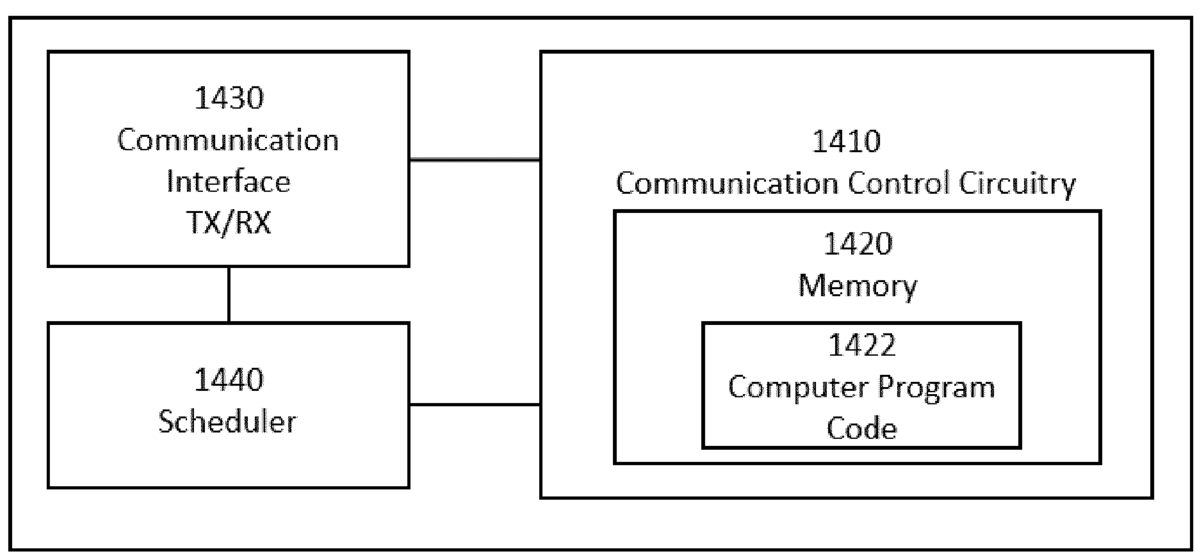

The apparatus 1400 of FIG. 14 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1400 may be an electronic device comprising one or more electronic circuitries. The apparatus 1400 may comprise a communication control circuitry 1410 such as at least one processor, and at least one memory 1420 including a computer program code (software) 1422 wherein the at least one memory and the computer program code (software) 1422 are configured, with the at least one processor, to cause the apparatus 1400 to carry out some of the exemplary embodiments described above.

The memory 1420 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1400 may further comprise a communication interface 1430 comprising hardware and/or software for realizing communication connectivity according to one or more communication protocols. The communication interface 1430 comprises at least one transmitter (TX) and at least one receiver (RX) that may be integrated to the apparatus 1400 or that the apparatus 1400 may be connected to. The communication interface 1430 provides the apparatus with radio communication capabilities to communicate in the cellular communication system. The communication interface may, for example, provide a radio interface to terminal devices. The apparatus 1400 may further comprise another interface towards a core network such as the network coordinator apparatus and/or to the access nodes of the cellular communication system. The apparatus 1400 may further comprise a scheduler 1440 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

LIST OF ABBREVIATIONS

4G: fourth generation
5G: fifth generation
ADC: analog-to-digital converter
ASIC: application-specific integrated circuit
BBU: baseband unit
CN: core network
CPS: cyber-physical system
CQI: channel quality indicator
$CSSF_{inter}$: carrier-specific scaling factor
CSSP: customer-specific standard product
CU: central unit
CU-CP: central unit control plane
CU-UP: central unit user plane
DAC: digital-to-analog converter
DFE: digital front end
DRAM: dynamic random-access memory
DRX: discontinuous reception
DSP: digital signal processor
DSPD: digital signal processing device
DU: distributed unit
EEPROM: electronically erasable programmable read-only memory

The invention claimed is:

1. An apparatus comprising:
at least one processor; and
at least one memory storing instructions that, when executed by the at least one processor, cause the apparatus to perform at least:
transmit, to a first base station associated with a first universal subscriber identity module, a first message indicating a request for a gap pattern for a second universal subscriber identity module; and
wherein the first message indicates at least one of:
a gap offset shift factor, wherein the gap offset shift factor indicates an allowed shift to a start time of the gap pattern, or
a request for selecting a gap offset for the gap pattern from a plurality of gap offsets indicated in the first message.

2. The apparatus according to claim 1, wherein the first message indicates the plurality of gap offsets:
the first message indicates at least the request for selecting the gap offset for the gap pattern from the plurality of gap offsets indicated in the first messages; and
the plurality of gap offsets is based at least partly on a synchronization signal block based radio resource management measurement timing configuration (SMTC) associated with the second universal subscriber identity module.

3. The apparatus according to claim 2, wherein the plurality of gap offsets overlap with an offset of the SMTC associated with the second universal subscriber identity module.

4. The apparatus according to claim 1, wherein the first message indicates at least the gap offset shift factor; and
the gap offset shift factor is based at least partly on a synchronization signal block periodicity associated with the second universal subscriber identity module.

5. The apparatus according to claim 1, wherein the first message indicates at least the gap offset shift factor; and
the instructions, when executed by the at least one processor, further cause the apparatus to perform at least:
receive, from the first base station, in response to the first message, a second message indicating the gap pattern, wherein the gap offset of the gap pattern indicated by the second message corresponds to the gap offset shift factor; and
allocate one or more gaps indicated by the gap pattern between the first universal subscriber identity module and the second universal subscriber identity module.

6. A second apparatus comprising:
at least one second processor; and
at least one second memory storing instructions that, when executed by the at least one second processor, cause the second apparatus to perform at least:
receive, from the apparatus according to claim 1, the first message;
determine the gap offset for the gap pattern; and
transmit, to the apparatus, a second message indicating at least the determined gap offset.

7. The second apparatus according to claim 6, wherein the first message indicates at least the gap offset shift factor; and
the gap offset is determined by adjusting the gap offset shift factor and adding the adjusted gap offset shift factor to a requested gap offset comprised in the first message.

8. The apparatus according to claim 6, wherein the second apparatus is comprised in the first base station.

9. The second apparatus according to claim 6, wherein the first message indicates at least the request for selecting the gap offset for the gap pattern from the plurality of gap offsets indicated in the first message; and the gap offset is determined by selecting the gap offset from the plurality of gap offsets.

10. The apparatus according to claim 1, wherein the first message indicates at least the gap offset shift factor; and the gap offset shift factor is based at least partly on a synchronization signal block based radio resource management measurement timing configuration (SMTC) associated with the second universal subscriber identity module.

11. The apparatus according to claim 2, wherein the first message also indicates the gap offset shift factor; and the gap offset shift factor is based at least partly on the SMTC associated with the second universal subscriber identity module.

12. The apparatus according to claim 11, wherein the plurality of gap offsets overlap with an offset of the SMTC associated with the second universal subscriber identity module.

13. The apparatus according to claim 1, wherein the first message indicates the plurality of gap offsets;

the first message indicates at least the request for selecting the gap offset for the gap pattern from the plurality of gap offsets indicated in the first message; and the plurality of gap offsets is based at least partly on a synchronization signal block periodicity associated with the second universal subscriber identity module.

14. The apparatus according to claim 4, wherein the first message also indicates the plurality of gap offsets;

the first message also indicates at least the request for selecting the gap offset for the gap pattern from the plurality of gap offsets indicated in the first message; and the plurality of gap offsets is based at least partly on a synchronization signal block periodicity associated with the second universal subscriber identity module.

15. The apparatus according to claim 1, wherein the first message indicates at least the plurality of gap offsets;

the first message also indicates at least the request for selecting the gap offset for the gap pattern from the plurality of gap offsets indicated in the first message; and the instructions, when executed by the at least one processor, further cause the apparatus to perform at least:

receive, from the first base station, in response to the first message, a second message indicating the gap pattern, wherein the gap offset of the gap pattern indicated by the second message corresponds to one gap offset of the plurality of gap offsets indicated in the first message; and allocate one or more gaps indicated by the gap pattern between the first universal subscriber identity module and the second universal subscriber identity module.

16. The apparatus according to claim 5, wherein the first message also indicates at least the plurality of gap offsets;

the first message also indicates at least the request for selecting the gap offset for the gap pattern from the plurality of gap offsets indicated in the first message; and the gap offset of the gap pattern indicated by the second message also corresponds to one gap offset of the plurality of gap offsets indicated in the first message.

* * * * *